(12) United States Patent
Moses et al.

(10) Patent No.: US 9,247,490 B2
(45) Date of Patent: *Jan. 26, 2016

(54) STATISTICS FOR OPTIMIZING DISTRIBUTED MOBILITY ANCHORING FOR WIRELESS NETWORKS

(71) Applicant: INTEL CORPORATION, Santa Clara, CA (US)

(72) Inventors: Danny Moses, Reut (IL); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/942,252

(22) Filed: Jul. 15, 2013

(65) Prior Publication Data

US 2014/0023039 A1 Jan. 23, 2014

Related U.S. Application Data

(60) Provisional application No. 61/674,274, filed on Jul. 20, 2012.

(51) Int. Cl.

| | |
|---|---|
| *H04W 36/08* | (2009.01) |
| *H04W 48/16* | (2009.01) |
| *H04W 48/00* | (2009.01) |
| *H04W 36/34* | (2009.01) |
| *H04B 7/02* | (2006.01) |
| *H04W 60/00* | (2009.01) |
| *H04W 36/00* | (2009.01) |
| *H04W 8/08* | (2009.01) |
| *H04W 80/04* | (2009.01) |
| *H04W 84/12* | (2009.01) |

(52) U.S. Cl.
CPC .............. *H04W 48/16* (2013.01); *H04B 7/024* (2013.01); *H04W 36/0016* (2013.01); *H04W 36/34* (2013.01); *H04W 48/17* (2013.01); *H04W 60/00* (2013.01); *H04W 8/085* (2013.01); *H04W 36/08* (2013.01); *H04W 80/04* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,593,722 B2* | 9/2009 | Jagadeesan et al. | 455/418 |
| 7,610,049 B2* | 10/2009 | Watanabe | 455/436 |
| 8,238,930 B2* | 8/2012 | Awano | 455/453 |
| 8,248,916 B2* | 8/2012 | Baglin et al. | 370/217 |
| 8,588,784 B2* | 11/2013 | Kato | 455/438 |
| 8,599,790 B1* | 12/2013 | Damle et al. | 370/331 |
| 8,812,871 B2* | 8/2014 | Monclus et al. | 713/190 |
| 8,862,124 B2* | 10/2014 | Navali et al. | 455/432.1 |
| 2001/0046223 A1* | 11/2001 | Malki et al. | 370/338 |
| 2002/0199104 A1* | 12/2002 | Kakemizu et al. | 713/168 |
| 2004/0235472 A1* | 11/2004 | Fujishima et al. | 455/434 |

(Continued)

*Primary Examiner* — Bunjob Jaroenchonwanit
(74) *Attorney, Agent, or Firm* — Alpine Technology Law Group LLC

(57) ABSTRACT

Briefly, in accordance with one or more embodiments a mobility anchor point may operate in a distributed mobility anchor network. The mobility anchor point comprises a processor and a memory coupled to the processor, wherein the processor is configured by instructions in the memory to receive a request from a mobile node to connect with a base station, store one or more connection statistics regarding the connect request in a cache, send the one or more connection statistics to a mobility manager, and receive a message from the mobility manager indicating an identity of an assigned mobility anchor assigned to the mobile node.

20 Claims, 12 Drawing Sheets

(56) References Cited

U.S. PATENT DOCUMENTS

| | | | |
|---|---|---|---|
| 2004/0246933 A1* | 12/2004 | Valko et al. | 370/338 |
| 2005/0259663 A1* | 11/2005 | Ode et al. | 370/395.4 |
| 2006/0040663 A1* | 2/2006 | Ise et al. | 455/434 |
| 2006/0117111 A1* | 6/2006 | Sudo | 709/238 |
| 2006/0185013 A1* | 8/2006 | Oyama et al. | 726/21 |
| 2007/0008906 A1* | 1/2007 | Han et al. | 370/254 |
| 2007/0014262 A1* | 1/2007 | Gras et al. | 370/331 |
| 2007/0025292 A1* | 2/2007 | Maksymczuk et al. | 370/331 |
| 2007/0121497 A1* | 5/2007 | Ang et al. | 370/229 |
| 2007/0253372 A1* | 11/2007 | Nakayasu | 370/331 |
| 2008/0031212 A1* | 2/2008 | Ogura | 370/338 |
| 2008/0104192 A1* | 5/2008 | Xie et al. | 709/212 |
| 2008/0139147 A1* | 6/2008 | Wu et al. | 455/187.1 |
| 2008/0225806 A1* | 9/2008 | Arian et al. | 370/338 |
| 2008/0297847 A1* | 12/2008 | Yamazaki et al. | 358/1.15 |
| 2009/0010206 A1* | 1/2009 | Giaretta et al. | 370/328 |
| 2009/0067366 A1* | 3/2009 | Aust et al. | 370/328 |
| 2009/0163203 A1* | 6/2009 | Stojanovski et al. | 455/432.3 |
| 2009/0290540 A1* | 11/2009 | Cherian et al. | 370/328 |
| 2009/0303914 A1* | 12/2009 | Gonsa et al. | 370/312 |
| 2010/0008319 A1* | 1/2010 | Awano | 370/329 |
| 2010/0027508 A1* | 2/2010 | Jee et al. | 370/331 |
| 2010/0046434 A1* | 2/2010 | Weniger et al. | 370/328 |
| 2010/0056175 A1* | 3/2010 | Bachmann et al. | 455/456.1 |
| 2010/0098021 A1* | 4/2010 | Stammers et al. | 370/331 |
| 2010/0177686 A1* | 7/2010 | Abeille et al. | 370/328 |
| 2010/0184436 A1* | 7/2010 | Tachikawa | 455/436 |
| 2010/0223365 A1* | 9/2010 | Liebsch et al. | 709/221 |
| 2010/0246532 A1* | 9/2010 | Olvera-Hernandez et al. | 370/331 |
| 2010/0254347 A1* | 10/2010 | Muhanna et al. | 370/331 |
| 2010/0272063 A1* | 10/2010 | Kato et al. | 370/331 |
| 2010/0315992 A1* | 12/2010 | Turanyi | 370/315 |
| 2011/0080872 A1* | 4/2011 | Chan et al. | 370/328 |
| 2011/0110328 A1* | 5/2011 | Pradeep et al. | 370/331 |
| 2011/0116450 A1* | 5/2011 | Hirano et al. | 370/328 |
| 2011/0191494 A1* | 8/2011 | Turanyi et al. | 709/242 |
| 2011/0216680 A1* | 9/2011 | Vogt et al. | 370/310 |
| 2011/0269499 A1* | 11/2011 | Vikberg et al. | 455/524 |
| 2011/0286395 A1* | 11/2011 | Liebsch et al. | 370/328 |
| 2011/0289219 A1* | 11/2011 | Braudes et al. | 709/227 |
| 2011/0294509 A1* | 12/2011 | Kim et al. | 455/436 |
| 2012/0134346 A1* | 5/2012 | Bosch et al. | 370/338 |
| 2012/0155442 A1* | 6/2012 | Haddad et al. | 370/338 |
| 2012/0166617 A1* | 6/2012 | Chang et al. | 709/224 |
| 2012/0178379 A1* | 7/2012 | Chen et al. | 455/68 |
| 2012/0202493 A1* | 8/2012 | Wang et al. | 455/435.1 |
| 2012/0257566 A1* | 10/2012 | Le et al. | 370/328 |
| 2012/0290699 A1* | 11/2012 | Zhang et al. | 709/223 |
| 2012/0302196 A1* | 11/2012 | Chin et al. | 455/404.1 |
| 2013/0044682 A1* | 2/2013 | Qiang et al. | 370/328 |
| 2013/0051361 A1* | 2/2013 | Yokoyama | 370/331 |
| 2013/0170356 A1* | 7/2013 | Awano | 370/236 |
| 2013/0237224 A1* | 9/2013 | Fujino et al. | 455/435.1 |
| 2014/0023038 A1* | 1/2014 | Venkatachalam et al. | 370/331 |
| 2014/0023039 A1* | 1/2014 | Moses et al. | 370/331 |
| 2014/0106736 A1* | 4/2014 | OLSON et al. | 455/422.1 |
| 2014/0301200 A1* | 10/2014 | Miura et al. | 370/235 |
| 2014/0307629 A1* | 10/2014 | Liebsch | 370/328 |
| 2014/0334469 A1* | 11/2014 | Chen et al. | 370/338 |
| 2014/0341109 A1* | 11/2014 | Cartmell et al. | 370/328 |
| 2014/0370902 A1* | 12/2014 | Kim et al. | 455/438 |
| 2014/0378133 A1* | 12/2014 | Kim et al. | 455/436 |
| 2015/0081860 A1* | 3/2015 | Kuehnel et al. | 709/222 |

* cited by examiner

# STATISTICS FOR OPTIMIZING DISTRIBUTED MOBILITY ANCHORING FOR WIRELESS NETWORKS

CROSS-REFERENCE TO RELATED APPLICATIONS

The present application claims the benefit of U.S. Provisional Application No. 61/674,274 filed Jul. 20, 2012. Said Application No. 61/674,274 is hereby incorporated herein in its entirety.

BACKGROUND

In order to be able to transfer packets to and from remote devices, a communication device uses the Internet Protocol (IP) address of the destination to designate to where the packet should be transferred and its own IP address to indicate to the remote device where to send the reply packets, if any. As a result, each device is assigned an IP address when connecting to a network. The IP address comprises a network portion and host or device portion. The network portion is assigned according to the network to which the device is directly connected, and the host portion is a unique value within that local network.

In mobile networks, mobile nodes are connected to an access network via a radio link with a base station. The base station provides a radio link for connecting with several mobile nodes that are in its coverage area. The base station in turn is connected through an IP connection to an access network. The access network is connected via edge routers to the Internet, thus providing connectivity for the mobile nodes to any device that is connected to the Internet.

Mobile nodes are unique in the sense that when moving they may leave the coverage area of one base station and arrive in the coverage area of a different base station which may result in the mobile node being connected to a different local area network. The movement of the mobile node between base stations may result in a clash between the network address of the new local area network and the address part of the IP address of the mobile node. The clash should be resolved in order to maintain the ability of the mobile node to transmit and receive packets.

One solution for this clash is to assign a new IP address to the mobile node when it connects to a new base station where the network part of the new address is aligned with the new local area network address. This solution may be problematic in that changing the IP address of a mobile node in the middle of a session involves various complex operations to enable the continuation of established connections between the mobile node and other devices.

Another resolution of the clash may involve using Proxy Mobile IP protocol (PMIP) where the packets are tunneled between the base station and a Mobility Anchor Point (MAP) as the packets are transferred to and from the edge router and Internet. When a tunnel is created, a special IP address is used to transfer the packets between the MAP and the base-station through which the mobile node is connected. When the packets enter the tunnel, the packet is encapsulated with an additional IP header containing the tunnel IP address, and when the packet reaches the other endpoint of the tunnel, the extra header is removed (decapsulated). In this approach, the source and destination devices are able to communicate regardless of the actual base station being used by the mobile node. When the mobile node moves, a handover operation occurs between the original base station through which the mobile node had originally connected to the network and the new base station through which the device is currently connected to the network. The handover operation includes among other operations, the setting of a new tunnel between the MAP and the new base station for all traffic related to the IP address of the mobile node. The handover mechanism enables a mobile node to continue its communication without having to change its IP address. Moreover, this mechanism is transparent to the mobile node and to the peer devices with which the mobile node communicates.

Utilization of a centralized MAP may introduce some limitations. First, all IP address allocations for all connecting mobile nodes are performed by a single device, the MAP, which handles control traffic requesting a new IP address and the resulting reply between the base stations and the MAP. Second, all data traffic between the mobile nodes and their destination devices in the Internet are routed through a single central device, the MAP. Third, all packets transferred to and from the base station are tunneled resulting in an increase of overhead bytes as a result of the encapsulation that takes place. Fourth, the MAP requires extra processing power to encapsulate and decapsulate all packets arriving from and to the base stations.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
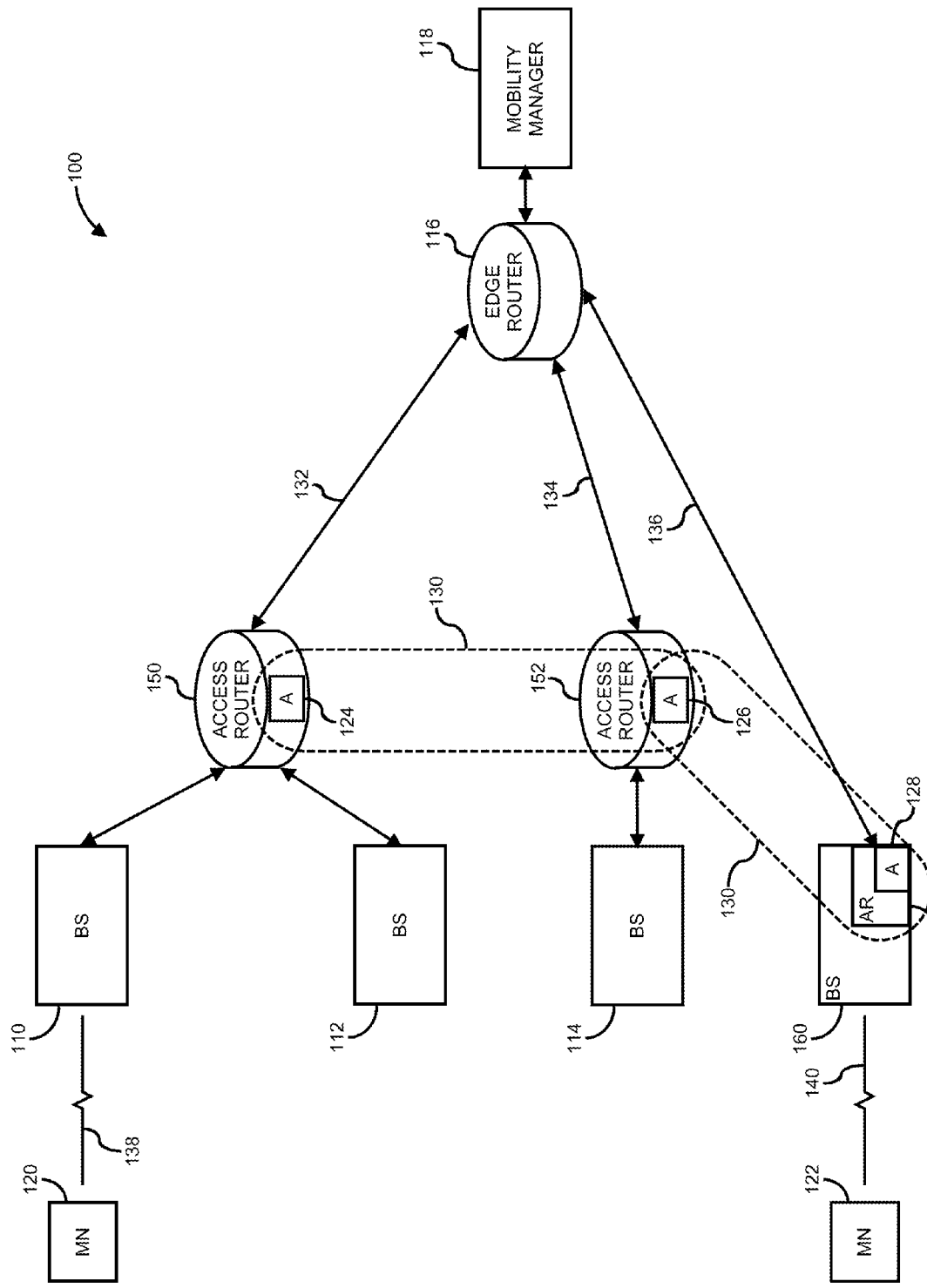
FIG. 1 is a diagram of a wireless network including distributed mobility anchor functionality in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a wireless network including distributed mobility anchor functionality in accordance with one or more embodiments will be discussed. As shown in FIG. 1, a wireless network 100 may comprise one or more base stations (BS) such as base station 110, base station 112, base station 114, and base station 160 coupled to an edge router 116 via one or more access routers 150, 152 and 154. Access router 154 is shown as being collocated with base station 160. The access routers 150, 152 and 154 are coupled to edge router 116 via link 132, link 134 and link 136, respectively. The base stations may serve one or mobile nodes (MN) such as mobile node 120 and mobile node 122. As shown, mobile node 120 may communicate with base station 110 via wireless link 138, and mobile node 122 may communicate with base station 114 via wireless link 140. The mobile nodes may be managed by a mobility manager 118 that controls the mobile nodes via the base stations, the access routers and edge router 116. In one or more embodiments, network 100 may be in compliance with an Institute of Electrical and Electronics Engineers (IEEE) standard such as an IEEE 802.16e standard to implement a Worldwide Interoperability for Microwave Access (WiMAX) network or an IEEE 802.16m standard to implement a WiMAX II standard. In such embodiments, a base station may be referred to as a WiMAX base station, a mobile node may be referred to as a mobile station, and a mobility manager may be referred to as an Access Service Network Gateway (ASN-GW). In one or more alternative embodiments, network 100 may be in compliance with a Third Generation Partnership Project (3GPP) standard such as a Long Term Evolution (LTE) standard or a Long Term Evolution Advanced (LTE-A) standard. In such embodiments, a base station may be referred to as an enhanced Node B (eNB), a mobile node may be referred to as user equipment (UE), and a mobility manager may be referred to as a mobility management entity (MME). It is noted, however, that the standards that may be implemented by network 100 and the devices thereof are merely examples, and the scope of the claimed subject matter is not limited in this respect.

In one or more embodiments, as shown in FIG. 1, the access routers 150, 152 and 154 of network 100 may be collocated with a mobility anchor function (A) such as mobility anchor 124 collocated with access router 150, mobility anchor 126 collocated with access router 152, and mobility anchor 128 collocated with access router 154. A mobility anchor generally may be considered as associated with a base station when the mobility anchor is collocated with an access router that connects that base station to the network. In some embodiments, base station 110 may connect to network 100 via access router 150 such that mobility anchor 124 may be considered as associated with base station 110. In other embodiments, access router 154 and mobility anchor 128 may be collocated with base station 160 such that mobility anchor 128 is associated with base station 160. By having the mobility anchor functions distributed in multiple devices such as the access routers as shown, network 100 implements a distributed mobility anchor 130 rather than having a centralized mobility anchor point. Whenever a mobile node connects to network 100, a mobility anchor will assign an Internet protocol (IP) address to the mobile node. In this arrangement, there is no need for a tunnel to be set at this point, and the control traffic for obtaining an IP address does not have to be run through a centralized entity. In such a scheme, mobility of a mobile node between coverage areas of different base stations is handled by the local mobility anchor function at the access router serving the base station or base stations in the event of a handoff from one base station to another. As will be discussed herein, in one or more embodiments, statistics regarding the connectivity behavior of the mobile nodes as the mobile nodes move among the various base stations may be collected by mobility manager 118 in order to optimize the distributed mobility anchor 130 function and traffic routing on network 100. Traffic routing after a mobile node handoff is shown in and described with respect to FIG. 2, below.

Figure 2:
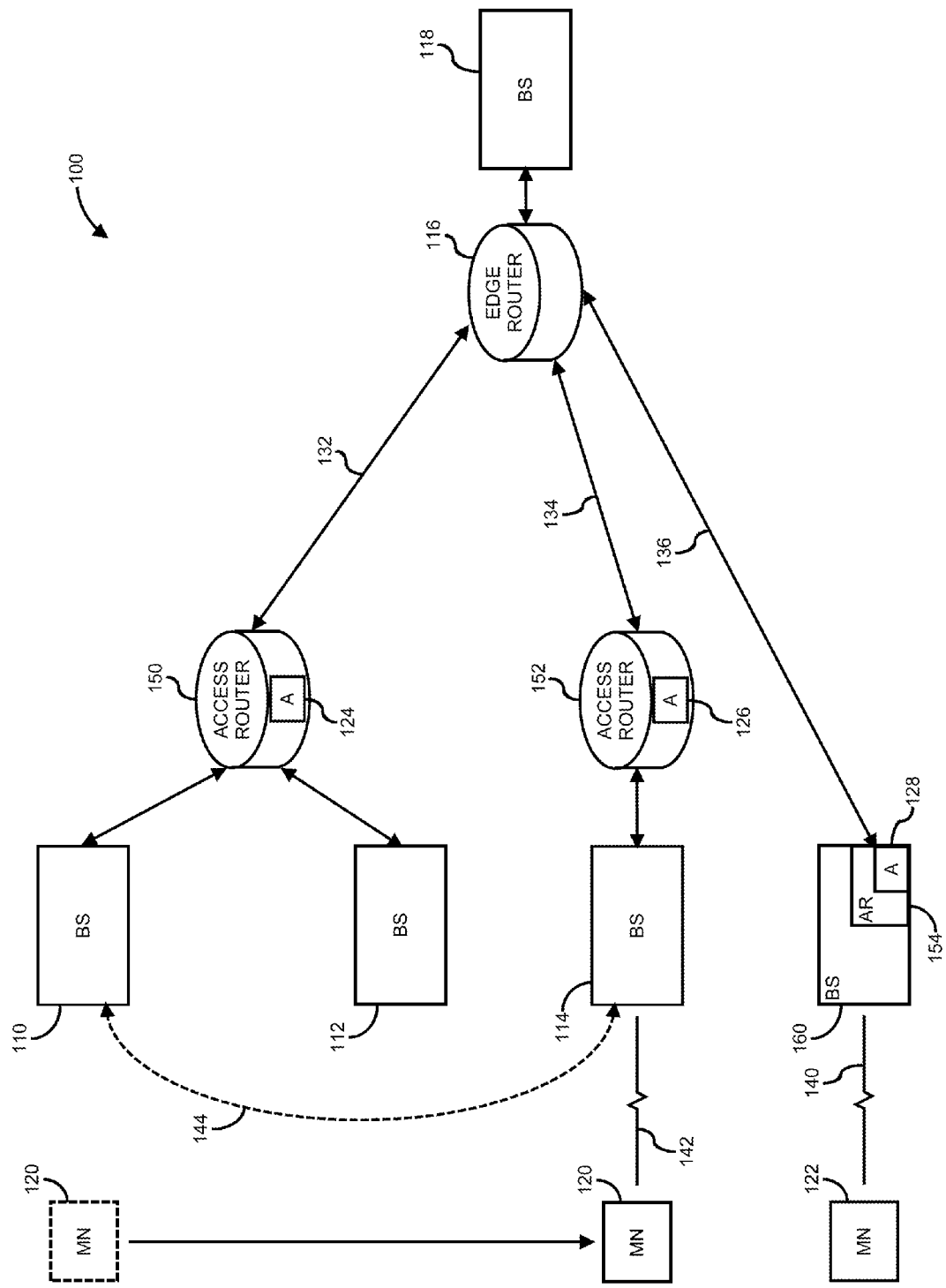
FIG. 2 is a diagram of the wireless network of FIG. 1 illustrating traffic routing after a mobile node handoff in accordance with one or more embodiments.

Referring now to FIG. 2, a diagram of the wireless network of FIG. 1 illustrating traffic routing after a mobile node handoff in accordance with one or more embodiments will be discussed. Initially, mobile node 120 may be connected with base station 110 via wireless link 138 as shown in FIG. 1 wherein. At this point, no tunneling is needed, and packets that are destined for mobile node 120 may be routed through edge router 116 and access router 150 collocated with mobility anchor 124 to base station 110 via link 132 and ultimately to mobile node 120 via wireless link 138 as shown in FIG. 1. As shown in FIG. 2, when mobile node 120 moves from the coverage area of base station 110 to the coverage area of base station 114 where base station 114 is coupled with access router 152 collocated with mobility anchor 126, mobile node 120 communicates with base station 114 via mobile link 142. At this point, a tunnel 144 is created between mobility anchor 124 and mobility anchor 126 110 and base station 114 since the new base station, base station 114, is coupled with a new mobility anchor, mobility anchor 126. Since the base stations are connected to different access routers, and hence to different respective mobility anchors, packets will arrive at the appropriate base station, and will be transmitted to and from the appropriate mobile node via tunneling. Mobility anchors include the function to perform encapsulation and decapsulation via tunneling. Likewise, when a mobile node moves from base station 110 to base station 112, no tunneling is required since both base stations are coupled to the same access router 150 and served by the same mobility anchor 124. In this arrangement, the original IP address that was assigned to mobile node 120 does not need to change even though mobile node 120 is now connected to a different access router, access router 152. Traffic arriving from the Internet 118 that is destined for mobile device 120 will continue to be forwarded by edge router 116 and access router 150 where it will be encapsulated by the collocated mobility anchor 124. As a result of encapsulation, mobility anchor 124 forwards the packet to access router 152 via tunnel 144 where it is decapsulated by mobility anchor 126 which is collocated with access router 152. The packet is then forwarded to mobile device 120 via base station 114. A tunnel such as tunnel 144 is formed by the ability to encapsulate and decapsulate packets, an ability which exists in the mobility anchor functions. In some embodiments, the mobility anchor function may be collocated in a base station such as base station 160, but such an arrangement is optional. Packets originated by mobile device 120 will follow the same path in reverse order to the new base station, base station 114, access router 152, to original access router 150 via tunnel 144, to edge router 116 to be routed over the Internet 118.

In one or more embodiments, a distributed mobility anchor 130 function as shown in FIG. 1 may allow IP address assignment to be performed locally by a serving base station which allows network 100 to handle more IP assignment requests per unit time since IP address assignment does not need to be performed by a central entity and therefore avoids having a single point of failure. Furthermore, no tunneling is involved for the initial assignment of IP addresses. In addition, when no handoff occurs there is no tunneling overhead, defined as computing and/or bandwidth resources, as would otherwise be involved with a centralized mobility anchor point. Even when a handoff occurs, mobility anchoring does not need to occur at a central mobility anchor point, resulting in lower tunneling overhead. Furthermore, utilization of a distributed mobility anchor function does not involve routing all traffic through a single device. In some embodiments, the base stations of network 100 may be connected to different ports of edge router 116, and/or through different edge routers.

In one or more embodiments, routing of traffic through network 100 using a distributed mobility anchor 130 may be optimized by optimizing a mobility anchor selection. Optimized mobility anchor selection may be performed by mobility manager 118 collecting statistics about the movement behavior of the mobile nodes. For example, if a particular mobile node is connected most of the time through the same base station, and hence it is located within the same geographic location, the associated mobility anchor will be assigned as the mobility anchor for that mobile node, even when the mobile node initially connects to network 100 through a different base station associated with a different mobility anchor. Alternatively, the decision to assign a mobility anchor for a mobile node may be based on optimizing the amount of data the mobile node transfers through a corresponding access router rather than being based on connection time. In either case, a tunnel may be created between a mobility anchor associated with the base station to which a mobile node is currently connected and the mobility anchor that originally assigned an IP address to that mobile node base station associated with the mobility anchor for the mobile node. Since according to the mobility pattern based on time or traffic it is likely that the mobile node will move to the area covered by its assigned access router, the tunnel will eventually no longer be needed. Thus, even though a mobile node may connect to a base station that is not associated with the assigned mobility anchor, traffic on the network may be optimized since the mobile node will eventually connect to the base station it statistically connects most of the time with and its associated mobility anchor. Another way of optimizing network traffic using distributed mobility anchor 130 may involve tracking the tunneling overhead on each access router and selecting a less loaded or the least loaded one as the access router associated with a mobility anchor for the mobile node. Various other methods may be implemented to optimize traffic on network 100 using distributed mobility anchor 130 functions, for example a combination of time, traffic, and or tunneling overhead, and the scope of the claimed subject matter is not limited in this respect.

In one or more embodiments, a connection event established between a mobile node and a base station may be a trigger for collecting information about the connectivity behavior of the mobile node. The mobility manager 118 may collect and store the connectivity behavior information as statistics or statistical data. This information is used by mobility manager 118 to optimally assign a mobility anchor point (MAP), which is the device assigned as the anchor (A) to a given mobile node, to a mobile node for future connections. In such an arrangement, statistics may be sent to mobility manager 118 from the MAP on each event, or collected by the MAP and sent to mobility manager 118 upon request. In order to minimize interaction between the MAP and mobility manager 118, the MAP may cache identifiers of the mobile nodes (MNids) that were identified by mobility manager 118 as being serviced by the assigned MAP wherein mobility manager 118 informed the MAP that the MAP may assign an Internet protocol (IP) prefix to the serviced mobile node.

Upon a connection or handoff event, the MAP requests mobility manager 118 permission to assign an IP address prefix to a mobile node. If the reply from mobility manager 118 is an approval, the MAP can cache the MNid so that it does not have to request permission again in subsequent connection events. Since cache entries may become obsolete at some point, for example after mobility manager 118 updates its MAPs to mobile nodes (MAPs-MNs) assignments, a mechanism may be provided to delete obsolete entries from the cache. Aging may not be ideal in some embodiments since MAPs-MNs assignments may be fairly static, in such embodiments, mobility manager 118 may explicitly request the deletion of obsolete cache entries, although the scope of the claimed subject matter is not limited in this respect. It should be noted that in some embodiments a distributed mobility anchor point 130 function may comprise one or more base stations and/or access routers being assigned as an anchor, or MAP, for one or more respective mobile nodes without involving a centralized MAP. In one or more alternative embodiments, a distributed mobility anchor point 130 may be utilized in conjunction with a centralized mobility anchor point to provide a hybrid mobility anchor scheme may be implemented as shown in and described with respect to FIG. 3, below.

Figure 3:
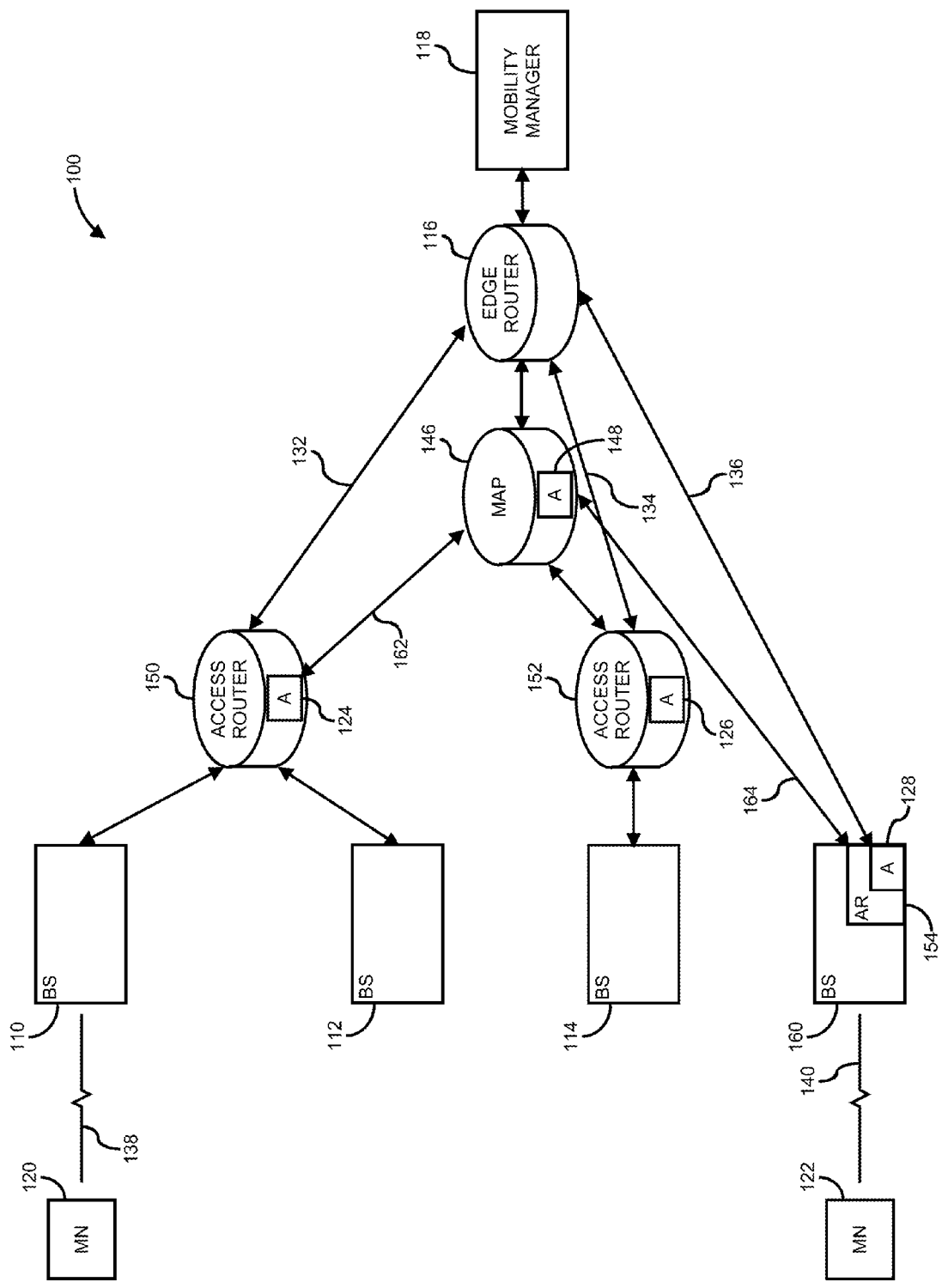
FIG. 3 is a diagram of a wireless network including hybrid mobility anchor functionality in accordance with one or more embodiments.

Referring now to FIG. 3, a diagram of a wireless network including hybrid mobility anchor functionality in accordance with one or more embodiments will be discussed. As shown in FIG. 3, a hybrid mobility anchor scheme that is a merger between a centralized mobility anchor function and a distributed mobility anchor function as shown in FIG. 1 and FIG. 2 may be implemented on network 100. In such an arrangement, mobile nodes that are not really mobile and which are essentially always or nearly always connected to network 100 through the same base station may be anchored to the base station to which the mobile node connects. Mobile nodes that have an identified mobility pattern with a high likelihood to be connected with a specific base station will be anchored to that specific base station. Mobile nodes that are highly mobile and which have no identified base station to which they are likely to be connected will be anchored by a centralized mobility anchor point (MAP) 146 that includes its own mobility anchor function 148. Alternatively, highly mobile nodes may be anchored with a lesser loaded or the least loaded access router.

In a hybrid mobility anchor scheme as shown in FIG. 3, the base stations may be connected to the centralized MAP 146 and to edge router 116. If a mobile node, such as mobile node 120, is anchored to centralized MAP 146 and connected to a base station, such as base station 110, then traffic from mobile node 120 will flow from base station 110 to centralized MAP 146 through access router 150 on its way to edge router 116. If mobile node 120 is instead anchored to access router and its collocated mobility anchor 124 which serves as an anchor point for mobile node 120, then traffic from mobile node 120 will flow directly to edge router 116 via link 132 without having to pass through centralized MAP 146. Likewise, if mobile node 122 is anchored to centralized MAP 146 and connected to base station 114, then traffic from mobile node 122 may be routed to centralized MAP 146 via access router 152 and then to edge router 116. If mobile node 122 is instead anchored to access router 152 and its collocated mobility anchor 126 which serves as an anchor point for mobile node 122, then traffic from mobile node 122 will flow directly to edge router 116 without having to pass through centralized MAP 146. Similarly as shown in and described with respect to FIG. 1 and FIG. 2, above, if a mobile node is anchored to a distributed mobility anchor serving the first base station and moves to the coverage area of a second base station, to accommodate the handoff a tunnel may be set up between the mobility anchors associated with the two base stations to handle the routing of traffic. Statistics for network 100 implementing a hybrid distributed mobility anchor point may be collected by the mobility anchor points including the base stations, access routers and centralized mobility anchor point 146 in a manner substantially similar to network 100 implementing a distributed mobility anchor point as shown in FIG. 1 and FIG. 2 above. Message flows for statistics gathering and cache entry invalidation for mobile node connection events are discussed, below.

Figure 4:
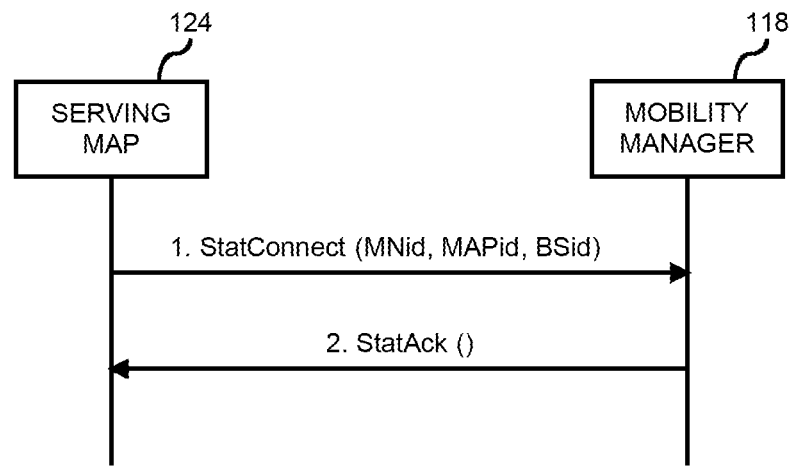
FIG. 4 is a diagram of statistics gathering for connect events in accordance with one or more embodiments.

Referring now to FIG. 4, a diagram of statistics gathering for connect events in accordance with one or more embodiments will be discussed. As shown in FIG. 4, a serving mobility anchor point (MAP) is a device on network 100 that provides mobility services to a mobile node (MN) including assigning an Internet protocol (IP) address or IP address prefix to the mobile node, provides session continuity services while a MN handoffs from one base station to another and provides tunneling if applicable, and which gathers statistics regarding the connectivity patterns of mobile nodes. Typically, a serving MAP may comprise an anchor function (A) serving a base station of network 100. Mobility manager 118 tracks location patterns of the mobile nodes and assigns an appropriate MAP for each respective collocated mobile node. In general, a MAP may be a centralized MAP such as centralized MAP 146 of FIG. 3 serving all covered mobile nodes, either in a centralized MAP embodiment or in a hybrid distributed mobility anchor point embodiment as shown in FIG. 3. Alternatively, a MAP may be a local MAP collocated with a base station or access router serving mobile nodes in a distributed mobility anchor 130 network 100 wherein the MAP assignment is made by mobility manager 118. In a distributed mobility anchor 130 embodiment, a MAP receives approval from mobility manager 118 before allocating an IP address or prefix to a connecting mobile node, or to establish a tunnel with another MAP that was selected by mobility manager 118 as the serving MAP for the mobile node. Furthermore, a MAP of a distributed mobility anchor point 130 may implement a cache of served mobile nodes to reduce the overhead of control message exchange with mobility manager 118. Whenever a connecting mobile node is approved by mobility manager 118 for IP address allocation, the mobile node is added to the cache. Mobile nodes are subsequently removed by specific indication from mobility manager 118. It should be noted that general modification of a serving MAP for a given mobile node is a rare event, although the scope of the claimed subject matter is not limited in this respect.

Events that are related to mobility management by mobility manger 118 include a mobile node connect or disconnect event regarding the entry or exit of a mobile node to or from network 100, and a handoff event regarding movement of a mobile node from one geographical location to another, resulting in a tear-down of the radio link from one base station and establishing a radio link with a new base station that involves updating or otherwise accommodating the IP prefix of the mobile node.

As shown in FIG. 4, the serving MAP 124 for a given mobile node gathers statistics when the mobile node connects to a base station. The connect statistics are stored by the serving MAP 124 which provides the connect statistics to mobility manager 118 via a statistic connect (StatConnect) message including the mobile node identifier (MNid), the identifier of the serving MAP 124 (MAPid), and the identifier of the base station to which the mobile node is connected (BSid). Mobility manager 118 records the time-of-day of the connect event with the identifier of the mobile node, and optionally the identifier of the base station with which the mobile node established a radio link, and the identifier of the MAP that is collocated or associated with the base station. In reply, mobility manager 118 sends a statistic acknowledgment message (StatAck) to the serving MAP 124.

Figure 5:
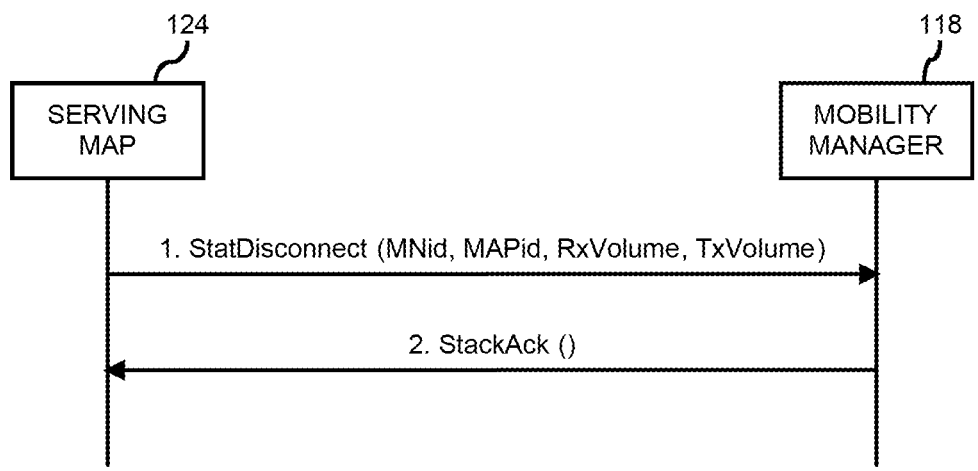
FIG. 5 is a diagram of statistics gathering for disconnect events in accordance with one or more embodiments.

Referring now to FIG. 5, a diagram of statistics gathering for disconnect events in accordance with one or more embodiments will be discussed. Similar to the connect event statistics gathering of FIG. 4, FIG. 5 shows the implementation of disconnect event statistics gathering. Mobility manager 118 records the time-of-day of the disconnect message (StatDisconnect) with the identifier of the mobile node, the identifier of the base station with which the mobile node established the radio link and the identifier of the serving MAP 124 that is collocated or associated with the base station. It also records the traffic volume which is the aggregated receive and transmit bytes that arrive at or are sent to or from the mobile node while connected to that base station.

Figure 6:
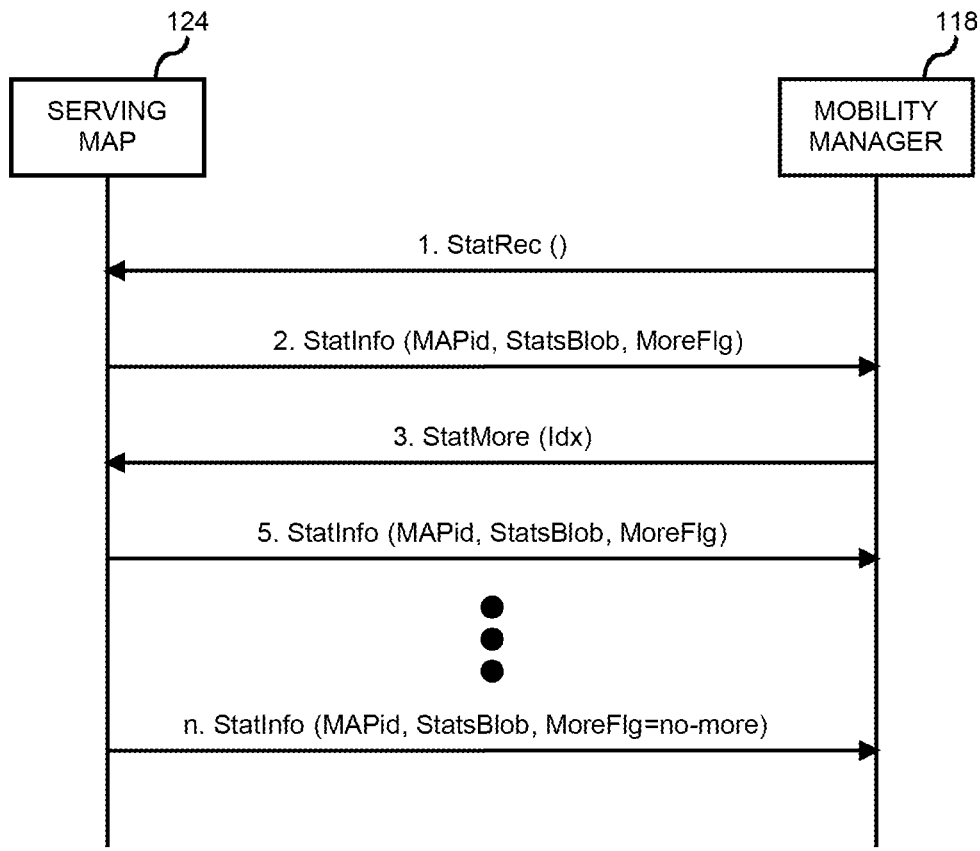
FIG. 6 is a diagram of polling for statistics in accordance with one or more embodiments.

Referring now to FIG. 6, a diagram of polling for statistics in accordance with one or more embodiments will be discussed. As an optimization, the serving MAP 124 may be configured to collect the statistics for all mobile nodes rather than send statistics messages. In such an arrangement, mobility manager 118 polls the serving MAPs 410 from time to time for the information. Since the information might be quite large, the information may be sent in fragments where the More Flag (MoreFlg) indicates to mobility manager 118 if additional information exists. Information also may be pulled using standard protocols for data acquisition/management like the simple network management protocol (SNMP).

Figure 7:
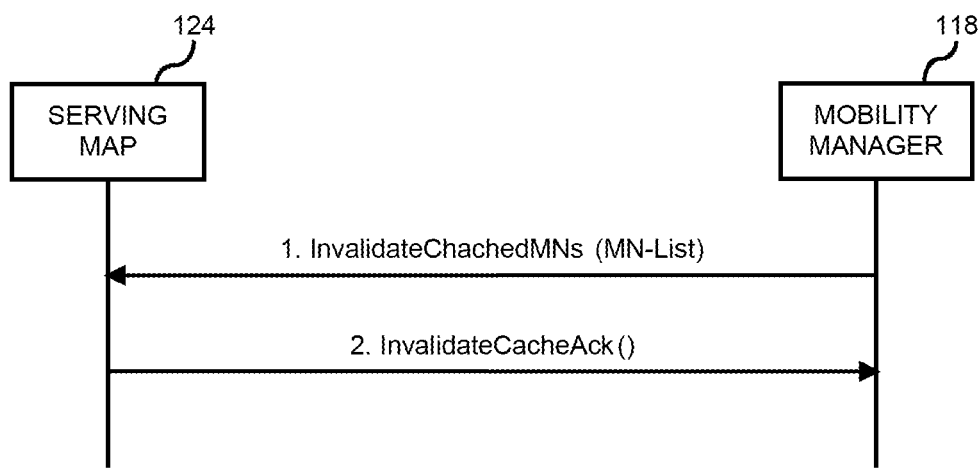
FIG. 7 is a diagram of cache entries invalidation in accordance with one or more embodiments.

Referring now to FIG. 7, a diagram of cache entries invalidation in accordance with one or more embodiments will be discussed. As shown in FIG. 7, mobility manager 118 will invalidate cache entries in the serving MAPs 118 after updating its MAPs-MNs assignments using an InvalidateCached-MNs (MN-List) message. Since several entries might be obsolete, a list of obsolete identifiers of mobile nodes may be sent in each message. An Invalidate All (InvalidatAll) value may be used for a request to invalidate the entire cache of the serving MAP 118.

Figure 8:
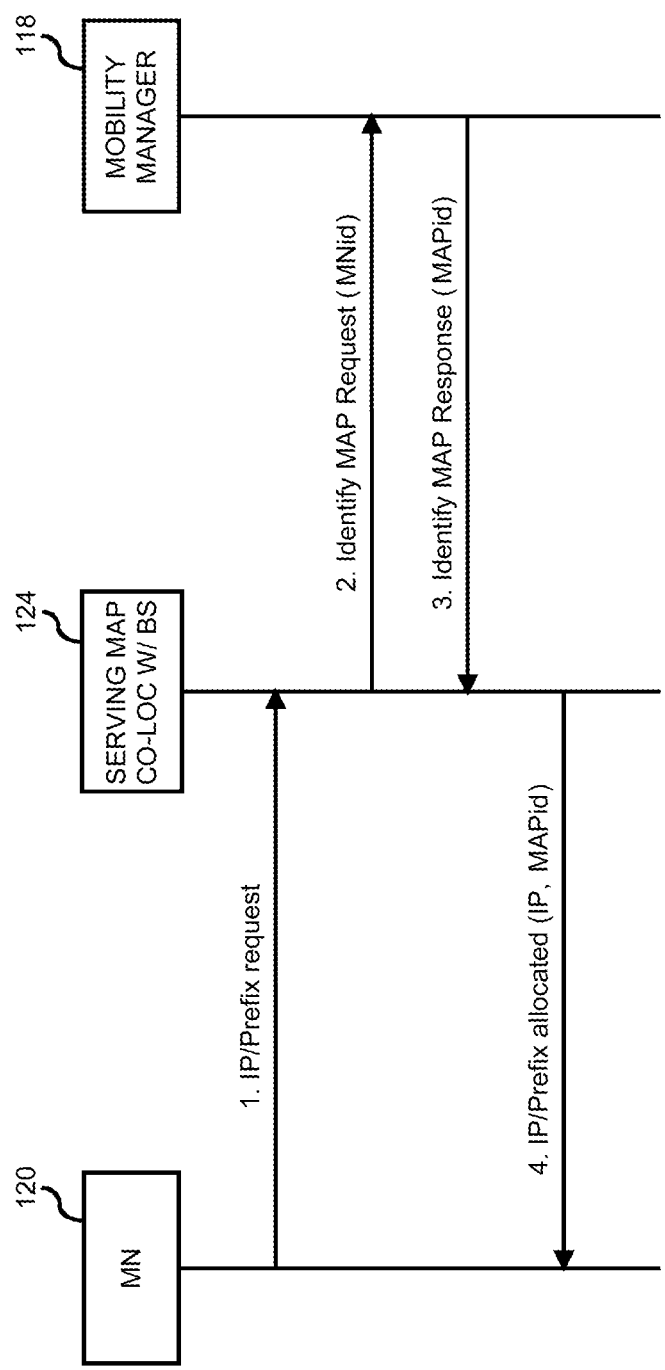
FIG. 8 is a diagram of an assignment of an IP address by a mobility anchor that is collocated with the base station with which the mobile node had established a radio link in accordance with one or more embodiments.

Referring now to FIG. 8, a diagram of an assignment of an IP address by a mobility anchor that is collocated with the base station with which the mobile node had established a radio link in accordance with one or more embodiments will be discussed. When the serving MAP 124 is collocated with the connected base station 110, the mobile node 120 sends an IP/prefix request to the serving MAP 124 that is collocated with the base station 110 to which the mobile node 120 is connecting. The serving MAP 124 then sends an identity MAP request to mobility manager 118 with the mobile node identifier (MNid) of the mobile node 120. Receipt of this message may serve as a connection start statistics event to trigger the collection of connection statistics. Mobility manager 118 replies to the serving MAP 124 with an Identify MAP Response with the MAP identifier (MAPid) of the assigned MAP for the mobile node 120. The serving MAP 124 then provides an IP/prefix allocation to the mobile node 120 which includes the IP address and the MAPid.

Figure 9:
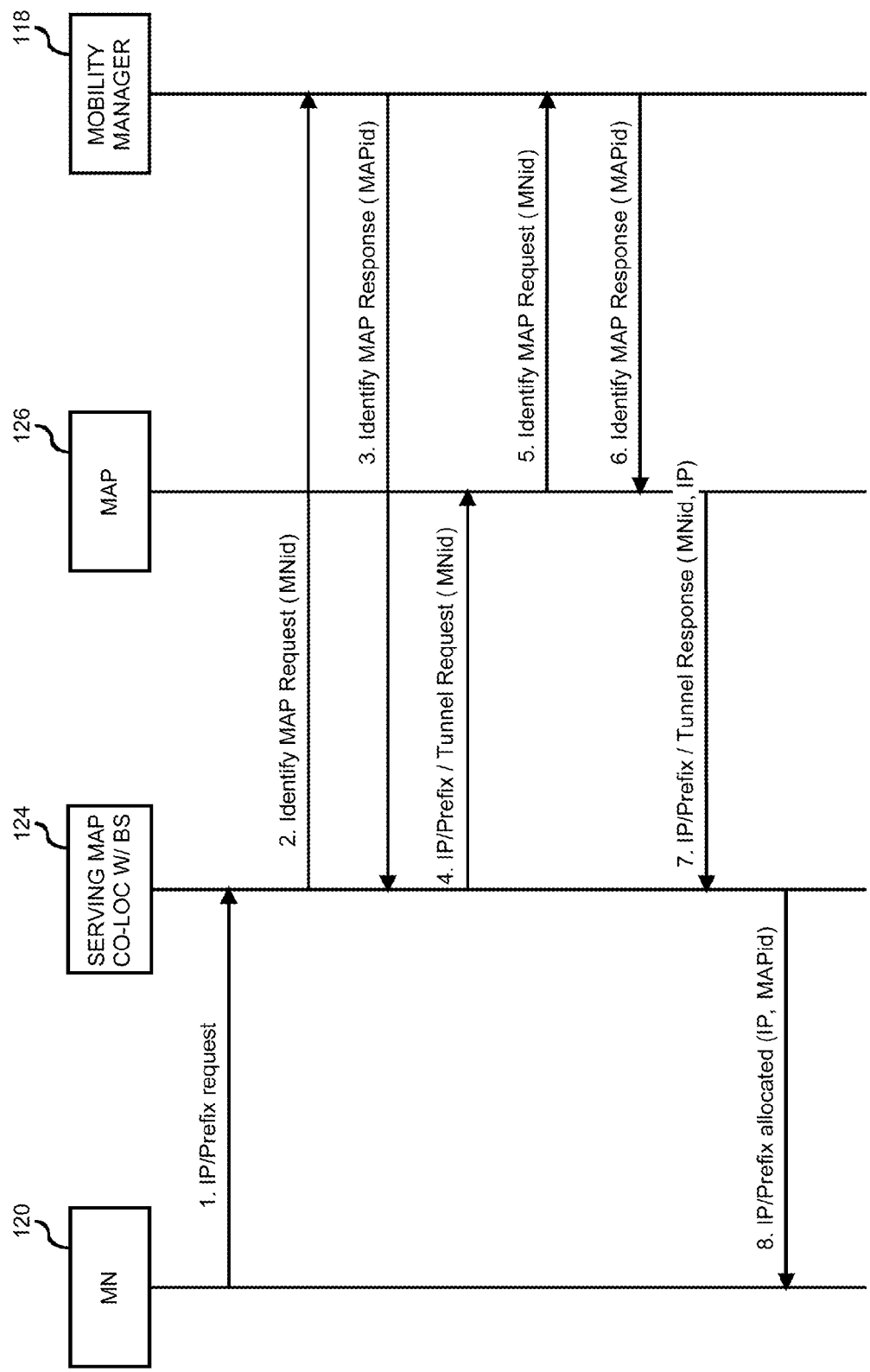
FIG. 9 is a diagram of an assignment of an IP address by a mobility anchor that is different from the mobility anchor that is collocated with the base station with which the mobile node had established a radio link in in accordance with one or more embodiments.

Referring now to FIG. 9, a diagram of an assignment of an IP address by a mobility anchor that is different from the mobility anchor that is collocated with the base station with which the mobile node had established a radio link in accordance with one or more embodiments will be discussed. As shown in FIG. 9, the mobile node 120 sends a IP/prefix request message to the serving MAP 124 that is collocated with the base station 110 to which the mobile node 120 is connecting. An Identify MAP Request message (MNid) is sent to mobility manager 118, which replies to the serving MAP 124 with an Identify MAP Response (MAPid) that indicates to serving MAP 124 that the mobile node 120 should be to another MAP 126. The Identify MAP Request message may serve as a connection start statistics event to trigger statistics gathering. In response, the topologically closer MAP 124 sends an IP/prefix and tunnel request to the MAP 126 that was assigned to be the mobility anchor by the mobility manager. MAP 126 sends an Identify MAP Request (MNid) message to mobility manager 118 which replies to the other MAP 126 with an Identify MAP Response (MAPid) message. This allows the MAP 126 to send an IP/prefix and Tunnel Response (MNid, IP) message to the topologically closer MAP 124, and for the serving MAP 124 to send an IP/prefix Allocated (IP, MAPid) message to the mobile node 120 forwarding the IP address that was allocated by MAP 126 to the mobile node.

Figure 10:
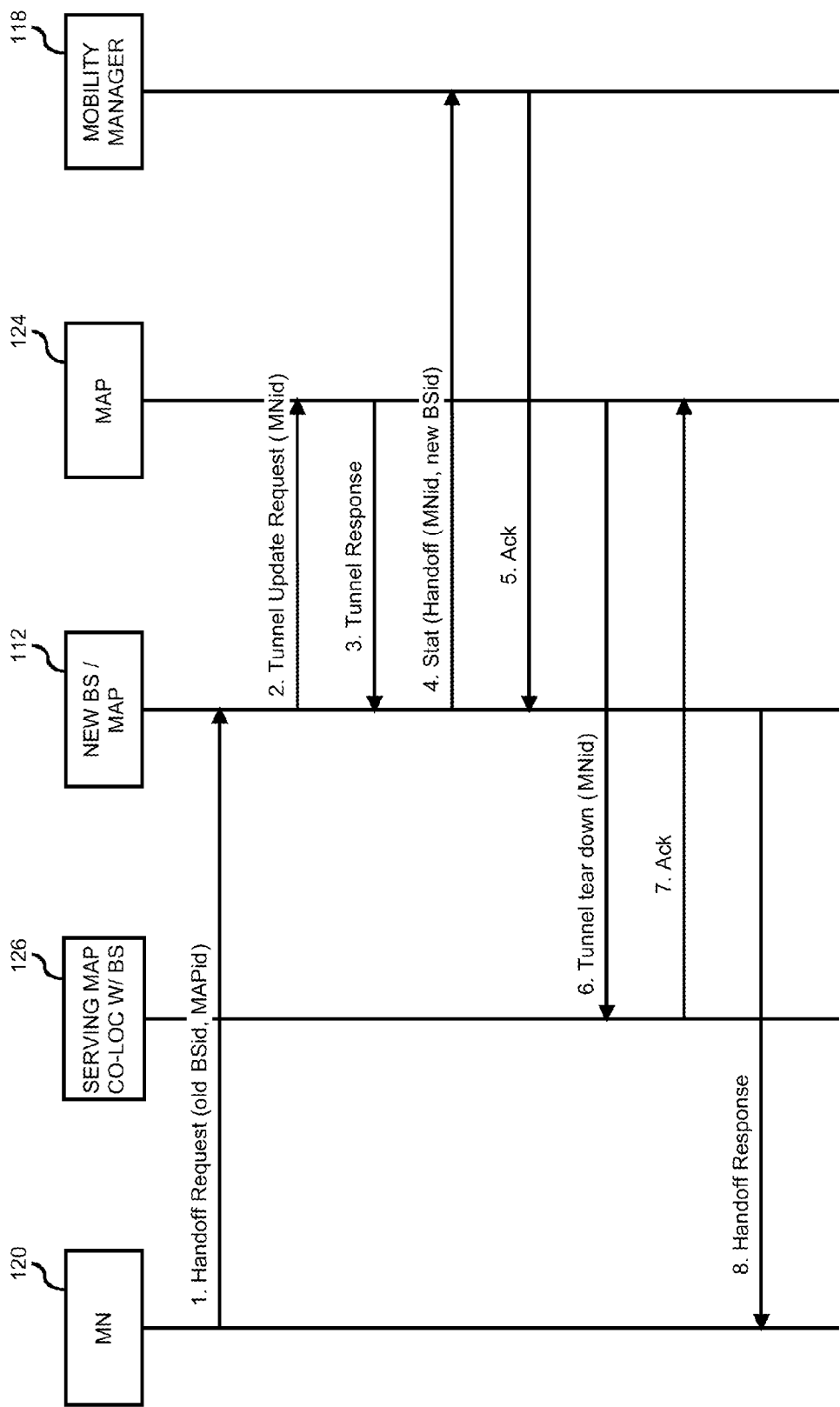
FIG. 10 is a diagram of a handoff between two base stations with corresponding collocated mobility anchors where the serving mobility anchor is neither of the two in accordance with one or more embodiments.

Referring now to FIG. 10, a diagram of a handoff between two base stations with corresponding collocated mobility anchors where the serving mobility anchor is neither of the two in accordance with one or more embodiments will be discussed. In one example, mobile node 120 may be connected to base station 126, but the serving MAP 124 is located elsewhere In such an arrangement, a tunnel 144 is established between MAP 124 and serving MAP 126 for the mobile node 120. When the mobile node 120 moves to the geographic area of base station 112 to be the new base station to which mobile node 120 will connect, the mobile node 120 send a handoff request message to the new base station 112 with the identifier of the old base station (old BSid) and the MAP identifier (MAPid) of MAP 124. The new base station 112 sends a Tunnel Update Request to MAP 124 with the mobile node identifier (MNid). MAP 124 provides a Tunnel Response message to the new base station 112, which in turn sends a handoff statistic message to mobility manager 118 with the mobile node identifier and the identifier of the new base station 112. Mobility manager 118 then sends an acknowledgment message to the new base station 112. MAP 124 then sends a Tunnel tear down (MNid) message to MAP 126 to tear down tunnel 144 for the identified mobile node 120, and MAP 126 sends an acknowledgment message to MAP 124 that the tunnel 144 has been torn down, allowing the new base station 112 to send a handoff response message to the mobile node 120 and connect with base station 112. As a result, the tunnel between MAP 124 and MAP 126 is replaced with a tunnel between MAP 112 and MAP 124.

Figure 11:
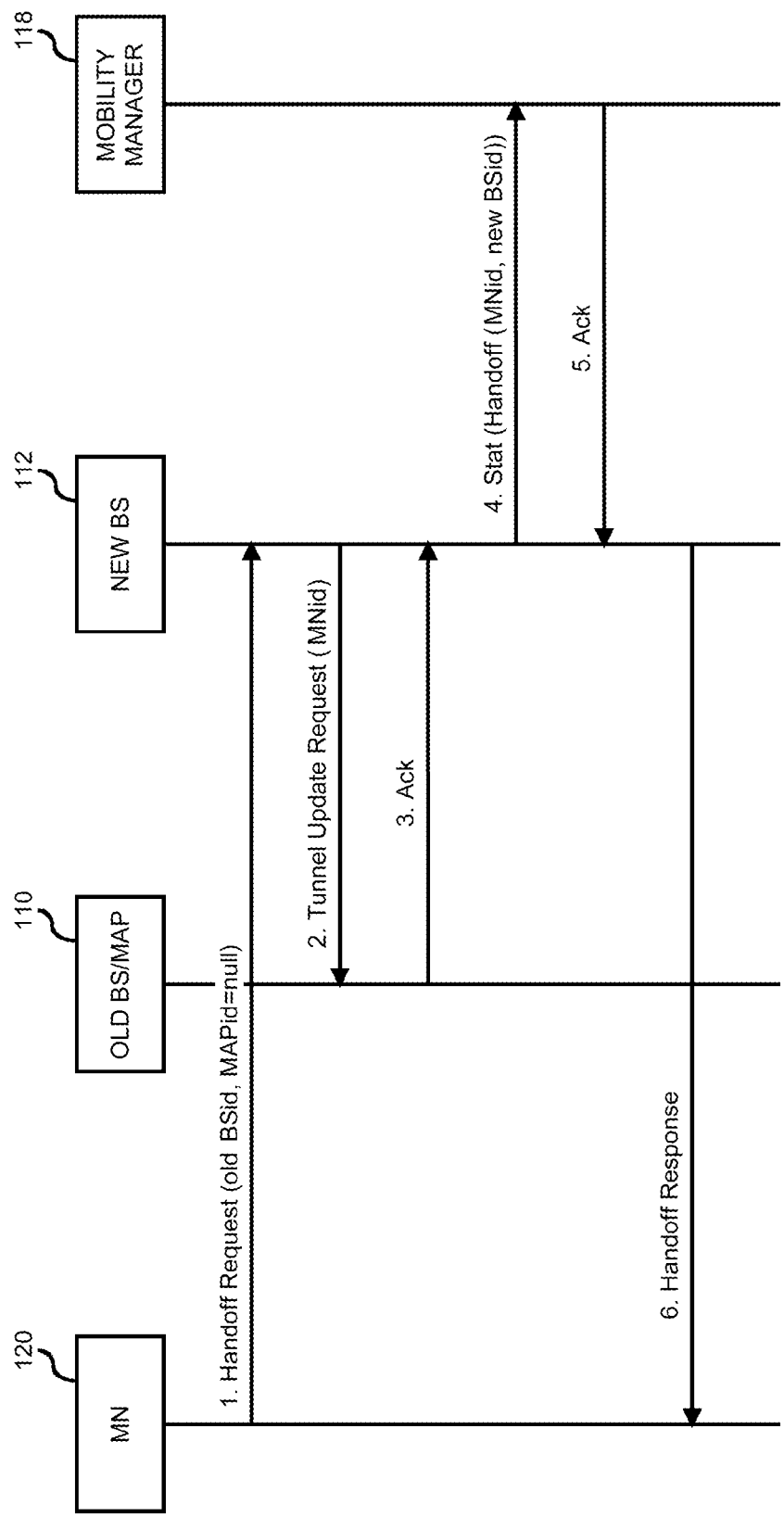
FIG. 11 is a diagram of a handoff from a base station that was collocated with a serving mobility access point in accordance with one or more embodiments.

Referring now to FIG. 11, a diagram of a handoff from a base station that was collocated with a serving mobility access point in accordance with one or more embodiments will be discussed. In one example, mobile node 120 may be connected to base station 110 which includes a serving MAP 124 that is collocated with base station 110. When the mobile node 120 moves to the geographic area of a new base station 112, the mobile node 120 may send a handoff request to the new base station 112 with the identifier of the old base station 110, and the identifier of the MAP being set to a null value. It should be noted that up to this point there was no need for a tunnel since the serving MAP was collocated with the base station to which the mobile node was connected. The new base station 112 then sends a Tunnel Update Request to the old base station 110 to establish a tunnel 144 for the identified mobile station 120. The old base station 110 then replies to the new base station 112 with an acknowledgment message acknowledging the establishment of the tunnel 144. The new base station 112 then sends a handoff statistics message to mobility manager 110 with the identifier of the mobile node 120 and the identifier of the new base station 112. Mobility manager 118 sends an acknowledgment message to the new base station 112, when then sends a Handoff Response message to the mobile node 120 to complete the handoff of the mobile node to the new base station 112.

Figure 12:
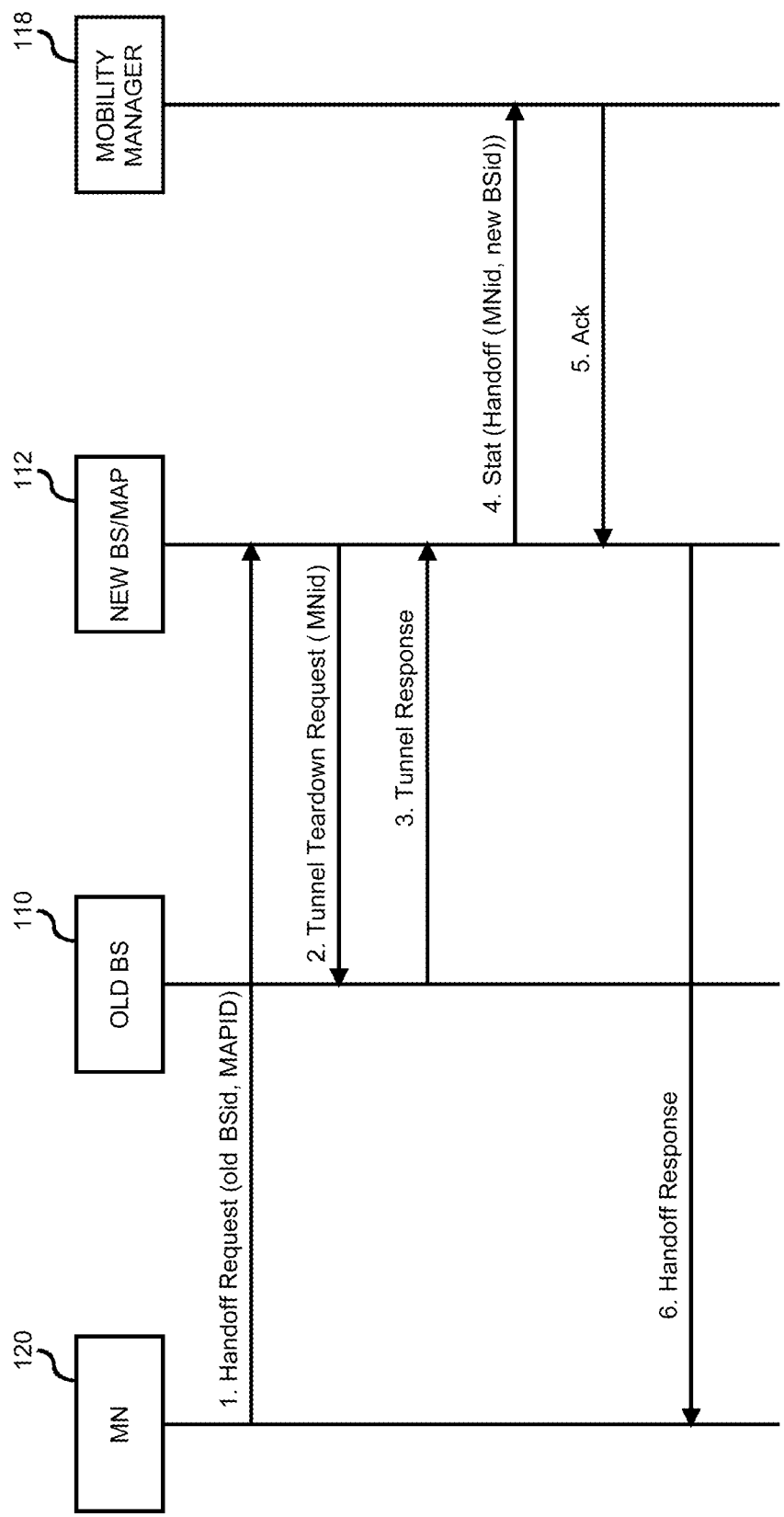
FIG. 12 is a diagram of a handoff between two base stations where the serving mobility anchor is collocated with the base station to which the mobile node will connect after handoff in accordance with one or more embodiments.

Referring now to FIG. 12, a diagram of a handoff between two base stations where the serving mobility anchor is collocated with the base station to which the mobile node will connect after handoff in accordance with one or more embodiments will be discussed. In one example mobile node 120 may be connected with base station 110, and the serving MAP 112 may be collocated at another base station. In such an arrangement, a tunnel may exist between base station 110 (associated mobility anchor) and base station 114 (associated mobility anchor). The mobile node 120 may move to the geographic area of a new base station 112 that is different than the old base station 110. The mobile node is moving to a new base station and its associated mobility anchor so as a result the tunnel between the old base station 110 and the new base station 112 is no longer needed. The mobile node 120 sends a Handoff Request to the new base station 112 with the identifier of the old base station 110 and the identifier of the serving MAP that is collocated with the old base station 110. The new base station 112 sends a Tunnel Teardown Request message with the identifier of the mobile node 120 to the old base station 110, which in turn sends a Tunnel Response message to the new base station 112 after the tunnel is torn down. The new base station 112 then sends a handoff statistics message to mobility manager 118 which replies with an acknowledgment message to the new base station 112. The new base station 112 then sends a Handoff Response message to the mobile node 120 to allow completion of the handoff of the mobile node 120 from the old base station 110 to the new base station 112.

Figure 13:
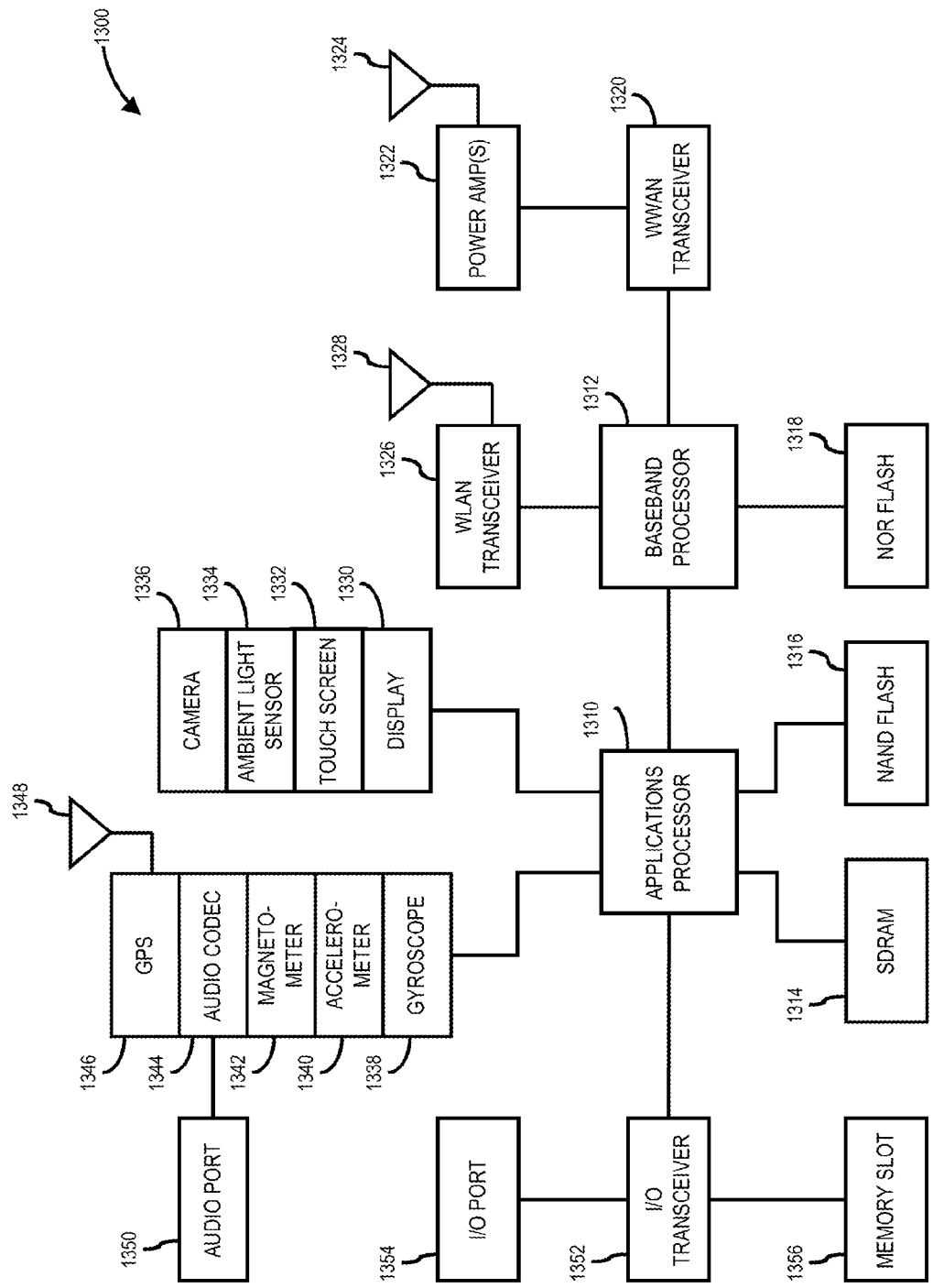
FIG. 13 is a block diagram of an information handling system capable of operating in a wireless network with distributed mobility anchor functionality in accordance with one or more embodiments.

Referring now to FIG. 13, a block diagram of an information handling system capable of operating in a wireless network with distributed mobility anchor functionality in accordance with one or more embodiments in accordance with one or more embodiments will be discussed. Information handling system 1300 of FIG. 13 may tangibly embody any one or more of the elements of network 100 of FIG. 1, FIG. 2 or FIG. 3 including for example base station 110, base station 112, base station 114, base station 160, edge router 116, access router 150, access router 152, access router 154, mobility manager 118, mobile node 120 and/or mobile node 122, with greater or fewer components depending on the hardware specifications of the particular device. Although information handling system 1300 represents one example of several types of computing platforms, information handling system 1300 may include more or fewer elements and/or different arrangements of elements than shown in FIG. 13, and the scope of the claimed subject matter is not limited in these respects.

In one or more embodiments, information handling system 1300 may include an applications processor 1310 and a baseband processor 1312. Applications processor 1310 may be utilized as a general-purpose processor to run applications and the various subsystems for information handling system 1300. Applications processor 1310 may include a single core or alternatively may include multiple processing cores wherein one or more of the cores may comprise a digital signal processor or digital signal processing (DSP) core. Furthermore, applications processor 1310 may include a graphics processor or coprocessor disposed on the same chip, or alternatively a graphics processor coupled to applications processor 1310 may comprise a separate, discrete graphics chip. Applications processor 1310 may include on board memory such as cache memory, and further may be coupled to external memory devices such as synchronous dynamic random access memory (SDRAM) 1314 for storing and/or executing applications during operation, and NAND flash 1316 for storing applications and/or data even when information handling system 1300 is powered off. In one or more embodiments, instructions to operate or configure the information handling system 1300 and/or any of its components or subsystems to operate in a manner as described herein may be stored on a article of manufacture comprising a non-transitory storage medium. In one or more embodiments, the storage medium may comprise any of the memory devices shown in and described herein, although the scope of the claimed subject matter is not limited in this respect. Baseband processor 1312 may control the broadband radio functions for information handling system 1300. Baseband processor 1312 may store code for controlling such broadband radio functions in a NOR flash 1318. Baseband processor 1312 controls a wireless wide area network (WWAN) transceiver 1320 which is used for modulating and/or demodulating broadband network signals, for example for communicating via a 3GPP LTE or LTE-Advanced network or the like.

In general, WWAN transceiver 1320 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 1320 couples to one or more power amps 1322 respectively coupled to one or more antennas 1324 for sending and receiving radio-frequency signals via the WWAN broadband network. The baseband processor 1312 also may control a wireless local area network (WLAN) transceiver 1326 coupled to one or more suitable antennas 1328 and which may be capable of communicating via a Wi-Fi, Bluetooth®, and/or an amplitude modulation (AM) or frequency modulation (FM) radio standard including an IEEE 802.11a/b/g/n standard or the like. It should be noted that these are merely example implementations for applications processor 1310 and baseband processor 1312, and the scope of the claimed subject matter is not limited in these respects. For example, any one or more of SDRAM 514, NAND flash 1316 and/or NOR flash 1318 may comprise other types of memory technology such as magnetic memory, chalcogenide memory, phase change memory, or ovonic memory, and the scope of the claimed subject matter is not limited in this respect.

In one or more embodiments, applications processor 1310 may drive a display 1330 for displaying various information or data, and may further receive touch input from a user via a touch screen 1332 for example via a finger or a stylus. An ambient light sensor 1334 may be utilized to detect an amount of ambient light in which information handling system 1300 is operating, for example to control a brightness or contrast value for display 1330 as a function of the intensity of ambient light detected by ambient light sensor 1334. One or more cameras 1336 may be utilized to capture images that are processed by applications processor 1310 and/or at least temporarily stored in NAND flash 1316. Furthermore, applications processor may couple to a gyroscope 1338, accelerometer 1340, magnetometer 1342, audio coder/decoder (CODEC) 1344, and/or global positioning system (GPS) controller 1346 coupled to an appropriate GPS antenna 1348, for detection of various environmental properties including location, movement, and/or orientation of information handling system 1300. Alternatively, controller 1346 may comprise a Global Navigation Satellite System (GNSS) controller. Audio CODEC 1344 may be coupled to one or more audio ports 1350 to provide microphone input and speaker outputs either via internal devices and/or via external devices coupled to information handling system via the audio ports 1350, for example via a headphone and microphone jack. In addition, applications processor 1310 may couple to one or more input/output (I/O) transceivers 1352 to couple to one or more I/O ports 1354 such as a universal serial bus (USB) port, a high-definition multimedia interface (HDMI) port, a serial port, and so on. Furthermore, one or more of the I/O transceivers 1352 may couple to one or more memory slots 1356 for optional removable memory such as secure digital (SD) card or a subscriber identity module (SIM) card, although the scope of the claimed subject matter is not limited in these respects.

Figure 14:
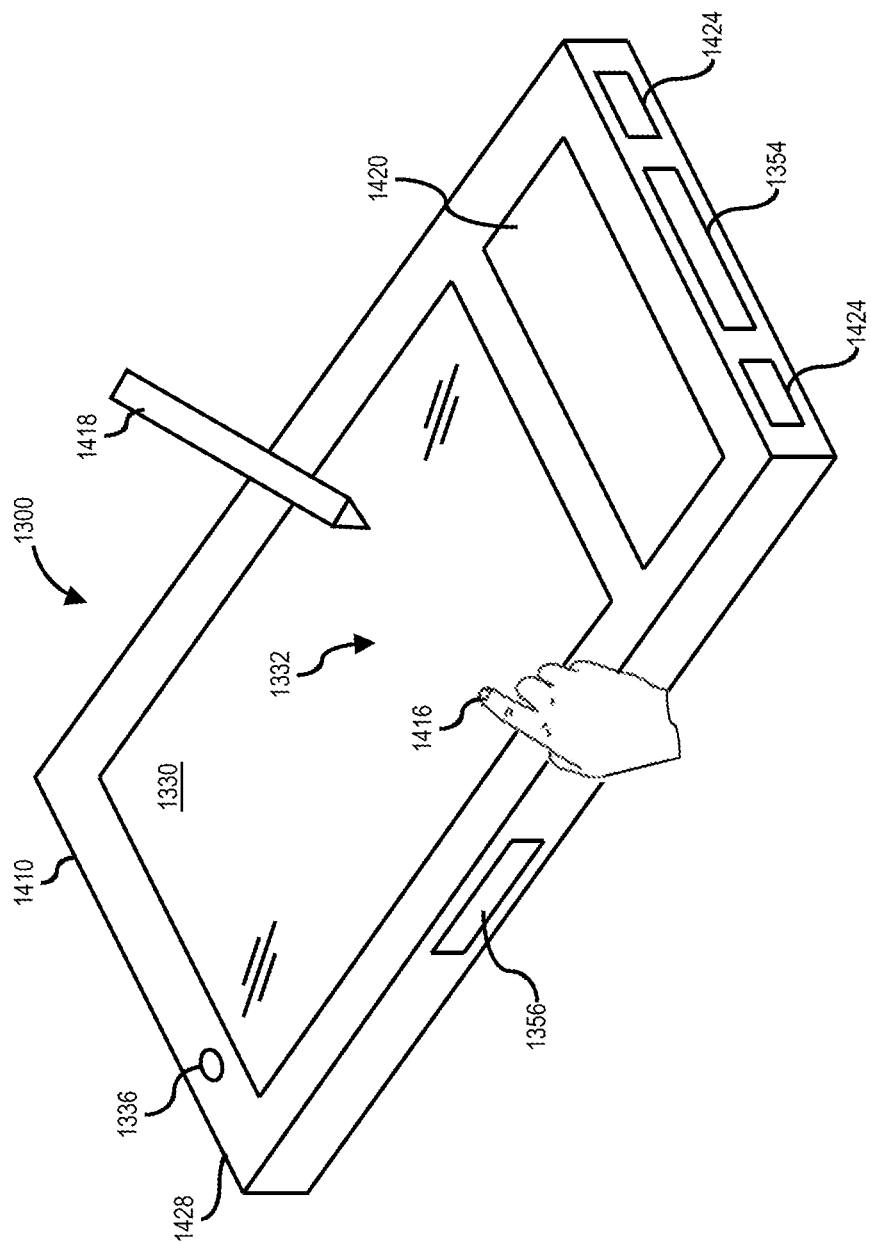
FIG. 14 is an isometric view of an information handling system of FIG. 13 that optionally may include a touch screen in accordance with one or more embodiments.

Referring now to FIG. 14, an isometric view of an information handling system of FIG. 5 that optionally may include a touch screen in accordance with one or more embodiments will be discussed. FIG. 14 shows an example implementation of information handling system 1300 of FIG. 13 tangibly embodied as a cellular telephone, smartphone, or tablet type device or the like. The information handling system 1300 may comprise a housing 1410 having a display 1230 which may include a touch screen 1332 for receiving tactile input control and commands via a finger 1416 of a user and/or a via stylus 1418 to control one or more applications processors 1310. The housing 1410 may house one or more components of information handling system 1300, for example one or more applications processors 1310, one or more of SDRAM 1314, NAND flash 1316, NOR flash 1318, baseband processor 1312, and/or WWAN transceiver 1320. The information handling system 1300 further may optionally include a physical actuator area 1420 which may comprise a keyboard or buttons for controlling information handling system via one or more buttons or switches. The information handling system 1300 may also include a memory port or slot 1356 for receiving non-volatile memory such as flash memory, for example in the form of a secure digital (SD) card or a subscriber identity module (SIM) card. Optionally, the information handling system 1300 may further include one or more speakers and/or microphones 1424 and a connection port 1354 for connecting the information handling system 1300 to another electronic device, dock, display, battery charger, and so on. In addition, information handling system 1300 may include a headphone or speaker jack 1428 and one or more cameras 1336 on one or more sides of the housing 1410. It should be noted that the information handling system 1300 of FIG. 14 may include more or fewer elements than shown, in various arrangements, and the scope of the claimed subject matter is not limited in this respect.

The following examples may be utilized in any one or more embodiments. In a first example, a mobility anchor point to operate in a distributed mobility anchor network comprises a processor and a memory coupled to the processor. The processor is configured by instructions in the memory to receive a request from a mobile node to connect with a base station, store one or more connection statistics regarding the connect request in a cache, send the one or more connection statistics to a mobility manager, and receive a message from the mobility manager indicating an identity of an assigned mobility anchor assigned to the mobile node. In a second example, the processor is configured to send the one or more connection statistics to the mobility manager upon receiving the connect request from the mobile node. In a third example, the processor is configured to collect the one or more connection statistics for one or more mobile nodes in the cache, and to send the one or more connection statistics to the mobility manager upon request. In a fourth example, the one or more connection statistics stored in the cache includes identifiers of mobile nodes that were indicated by the mobility manager as being served by the mobility anchor point. In a fifth example, the processor is configured to receive a message from the mobility manager to delete obsolete connection statistics from the cache. In a sixth example, the one or more connection statistics include time-of-day of the connect request, an identifier of the mobile node, an identifier of the base station, or an identifier of the mobility anchor point, or combinations thereof. In a seventh example, the one or more connection statistics include a connect event, a disconnect event, a handoff event, traffic volume, or combinations thereof. In an eighth example, the processor is configured to establish a tunnel to the assigned mobility anchor if the message from the mobility manager indicates that another mobility anchor point is assigned as the mobility anchor point for the mobile node. In a ninth example, the processor is configured to allocate an Internet protocol (IP) address to the mobile node if the message from the mobility manager indicates that the mobility anchor point is the assigned mobility anchor point for the mobile node. In a tenth example, the processor is configured to receive an Internet protocol (IP) address for the mobile node from an assigned mobility anchor point if the message from the mobility manager indicates that another mobility anchor point is the assigned mobility anchor point for the mobile node.

In an eleventh example, a mobility manager to operate in a distributed mobility anchor network comprises a processor and a memory coupled to the processor. The processor is configured by instructions in the memory to receive one or more connection statistics for one or more mobile nodes from a base station on the network, determine an assigned mobility anchor point for the mobile node based at least in part on the one or more connection statistics, wherein the assigned mobility anchor point is selected from a group of distributed mobility anchor points for the network, and send a message to a serving mobility anchor point indicating an identity of the assigned mobility anchor point. In a twelfth example, the processor is configured to receive the one or more connection statistics upon a connect event. In a thirteenth example, the processor is configured to request the one or more connection statistics stored in a cache on the base station and its collocated access router. In a fourteenth example, the processor is configured to poll the serving mobility anchor point for additional connection statistics if the mobility manager receives a message from the serving mobility anchor point indicating that additional connection statistics exist. In a fifteenth example, the one or more connection statistics stored in the cache includes identifiers of mobile nodes that were indicated by the mobility manager as being served by the serving mobility anchor point. In a sixteenth example, the one or more connection statistics include time-of-day of the connect request, an identifier of the mobile node, an identifier of the base station, or an identifier of the serving mobility anchor point, or combinations thereof. In a seventeenth example, the one or more connection statistics include a connect event, a disconnect event, a handoff event, traffic volume, or combinations thereof. In an eighteenth example, the processor is configured to send a message to the serving mobility anchor point to delete obsolete connection statistics from a cache of connection statistics at the base station. In a nineteenth example, the processor is configured to indicate to the serving mobility anchor point that the serving mobility anchor point has permission to assign an Internet protocol (IP) address to the mobile node if the message sent to the serving mobility anchor point indicates that the serving mobility anchor point is the assigned mobility anchor point assigned to the mobile node. In a twentieth example, the processor is configured to send an acknowledgment message to the serving mobility anchor point acknowledging a handoff of the mobile node to a new base station from another base station.

In a twenty-first example, a method to implement a handoff in a distributed mobility anchor network comprises receiving a handoff request at a serving mobility anchor point from a mobile node to handoff from a prior base station, wherein the handoff request includes an identity of an assigned mobility anchor point assigned to the mobile node, sending one or more connection statistics regarding the handoff request to a mobility manager, and sending a handoff response to the mobile node upon receiving an acknowledgment from the mobility manager. In a twenty-second example, the method further includes, if the serving mobility anchor point is the assigned mobility anchor point assigned to the mobile node, sending a request to a prior mobility anchor point associated with the prior base station to tear down a tunnel between the serving mobility anchor point and the prior mobility anchor point. In a twenty-third example, the method further includes, if the serving mobility anchor point is the assigned mobility anchor point assigned to the mobile node, sending a tunnel update request to a prior mobility anchor point associated with the prior base station to establish a tunnel between the serving mobility anchor point and the prior mobility anchor point. In a twenty-fourth example, the method further includes, if another mobility anchor point is the assigned mobility anchor point assigned to the mobile node that is not a prior mobility anchor point associated with the prior base station, sending a request to the prior mobility anchor point to tear down a tunnel between the prior mobility anchor point and the other mobility anchor point.

Although the claimed subject matter has been described with a certain degree of particularity, it should be recognized that elements thereof may be altered by persons skilled in the art without departing from the spirit and/or scope of claimed subject matter. It is believed that the subject matter pertaining to statistics for distributed mobility anchoring for wireless networks and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A mobility anchor point to operate in a distributed mobility anchor network, comprising:
   a processor; and
   a memory coupled to the processor, wherein the processor is configured by instructions in the memory to:
      receive a request from a mobile node to connect with a base station;
      store one or more connection statistics regarding the connect request in a cache;
      send the one or more connection statistics to a mobility manager; and
      receive a message from the mobility manager indicating an identity of an assigned mobility anchor assigned to the mobile node.

2. A mobility anchor point as claimed in claim 1, wherein the processor is configured to send the one or more connection statistics to the mobility manager upon receiving the connect request from the mobile node.

3. A mobility anchor point as claimed in claim 1, wherein the processor is configured to collect the one or more connection statistics for one or more mobile nodes in the cache, and to send the one or more connection statistics to the mobility manager upon request.

4. A mobility anchor point as claimed in claim 1, wherein the one or more connection statistics stored in the cache includes identifiers of mobile nodes that were indicated by the mobility manager as being served by the mobility anchor point.

5. A mobility anchor point as claimed in claim 1, wherein the processor is configured to receive a message from the mobility manager to delete obsolete connection statistics from the cache.

6. A mobility anchor point as claimed in claim 1, wherein the one or more connection statistics include time-of-day of the connect request, an identifier of the mobile node, an identifier of the base station, or an identifier of the mobility anchor point, or combinations thereof.

7. A mobility anchor point as claimed in claim 1, wherein the one or more connection statistics include a connect event, a disconnect event, a handoff event, traffic volume, or combinations thereof.

8. A mobility anchor point as claimed in claim 1, wherein the processor is configured to establish a tunnel to the assigned mobility anchor if the message from the mobility manager indicates that another mobility anchor point is assigned as the mobility anchor point for the mobile node.

9. A mobility anchor point as claimed in claim 1, wherein the processor is configured to allocate an Internet protocol (IP) address to the mobile node if the message from the mobility manager indicates that the mobility anchor point is the assigned mobility anchor point for the mobile node.

10. A mobility anchor point as claimed in claim 1, wherein the processor is configured to receive an Internet protocol (IP) address for the mobile node from an assigned mobility anchor point if the message from the mobility manager indicates that another mobility anchor point is the assigned mobility anchor point for the mobile node.

11. A mobility manager to operate in a distributed mobility anchor network, comprising:
a processor; and
a memory coupled to the processor, wherein the processor is configured by instructions in the memory to:
receive one or more connection statistics for one or more mobile nodes from a base station on the network;
determine an assigned mobility anchor point for the mobile node based at least in part on the one or more connection statistics, wherein the assigned mobility anchor point is selected from a group of distributed mobility anchor points for the network; and
send a message to a serving mobility anchor point indicating an identity of the assigned mobility anchor point.

12. A mobility manager as claimed in claim 11, wherein the processor is configured to receive the one or more connection statistics upon a connect event.

13. A mobility manager as claimed in claim 11, wherein the processor is configured to request the one or more connection statistics stored in a cache on the base station and its collocated access router.

14. A mobility manager as claimed in claim 11, wherein the processor is configured to poll the serving mobility anchor point for additional connection statistics if the mobility manager receives a message from the serving mobility anchor point indicating that additional connection statistics exist.

15. A mobility manager as claimed in claim 11, wherein the one or more connection statistics stored in the cache includes identifiers of mobile nodes that were indicated by the mobility manager as being served by the serving mobility anchor point.

16. A mobility manager as claimed in claim 11, wherein the one or more connection statistics include time-of-day of the connect request, an identifier of the mobile node, an identifier of the base station, or an identifier of the serving mobility anchor point, or combinations thereof.

17. A mobility manager as claimed in claim 11, wherein the one or more connection statistics include a connect event, a disconnect event, a handoff event, traffic volume, or combinations thereof.

18. A mobility manager as claimed in claim 11, wherein the processor is configured to send a message to the serving mobility anchor point to delete obsolete connection statistics from a cache of connection statistics at the base station.

19. A mobility manager as claimed in claim 11, wherein the processor is configured to indicate to the serving mobility anchor point that the serving mobility anchor point has permission to assign an Internet protocol (IP) address to the mobile node if the message sent to the serving mobility anchor point indicates that the serving mobility anchor point is the assigned mobility anchor point assigned to the mobile node.

20. A mobility manager as claimed in claim 11, wherein the processor is configured to send an acknowledgment message to the serving mobility anchor point acknowledging a handoff of the mobile node to a new base station from another base station.

* * * * *